United States Patent
Xu (10) Patent No.: US 12,289,746 B2
(45) Date of Patent: Apr. 29, 2025

(54) INFORMATION TRANSMISSION METHOD AND APPARATUS, TERMINAL, AND NETWORK DEVICE

(71) Applicant: GUANGDONG OPPO MOBILE TELECOMMUNICATIONS CORP., LTD., Guangdong (CN)

(72) Inventor: Jing Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 462 days.

(21) Appl. No.: 17/681,586

(22) Filed: Feb. 25, 2022

(65) Prior Publication Data
US 2022/0256529 A1 Aug. 11, 2022

Related U.S. Application Data (63) Continuation of application No. PCT/CN2019/103130, filed on Aug. 28, 2019.

(51) Int. Cl.
*H04W 4/00* (2018.01)
*H04W 24/08* (2009.01)
(Continued)

(52) U.S. Cl.
CPC .......... *H04W 72/51* (2023.01); *H04W 24/08* (2013.01); *H04W 72/0446* (2013.01); *H04W 72/23* (2023.01)

(58) Field of Classification Search
CPC . H04W 72/51; H04W 24/08; H04W 72/0446; H04W 72/23; H04W 72/20; H04W 28/04; H04W 72/04; H04W 72/042; H04W 88/08; H04W 28/08; H04W 28/084; H04W 36/22; H04W 72/12;
(Continued)

(56) References Cited

U.S. PATENT DOCUMENTS

| | | | | |
|---|---|---|---|---|
| 2012/0320838 A1* | 12/2012 | Yang | ..................... | H04L 1/0061 370/329 |
| 2013/0044653 A1* | 2/2013 | Yang | ..................... | H04W 72/21 370/280 |

(Continued)

FOREIGN PATENT DOCUMENTS

| | | |
|---|---|---|
| CN | 101699901 A | 4/2010 |
| CN | 109152050 A | 1/2019 |

(Continued)

OTHER PUBLICATIONS

The first Office Action of corresponding European application No. 19943667.6, dated Feb. 28, 2023.
(Continued)

*Primary Examiner* — Phuongchau Ba Nguyen
(74) *Attorney, Agent, or Firm* — Ladas & Parry, LLP

(57) ABSTRACT

Embodiments of the present application provide an information transmission method and apparatus, a terminal, and a network device, and the method includes that: a terminal receives at least one set of control signaling configuration, where the at least one set of control signaling configuration has an association relationship with at least one physical downlink control channel (PDCCH) detection capability of the terminal.

11 Claims, 4 Drawing Sheets

(51) Int. Cl.
*H04W 72/0446* (2023.01)
*H04W 72/23* (2023.01)
*H04W 72/51* (2023.01)

(58) Field of Classification Search
CPC ... H04L 5/0007; H04L 5/0094; H04L 5/0053; H04L 1/0023; H04L 1/0038; H04L 1/0061; Y02D 30/70
See application file for complete search history.

(56) References Cited

U.S. PATENT DOCUMENTS

| | | | |
|---|---|---|---|
| 2013/0107809 A1* | 5/2013 | Ko | H04W 4/00 370/328 |
| 2019/0215098 A1 | 7/2019 | Tiirola et al. | |
| 2019/0223164 A1* | 7/2019 | He | H04L 25/0204 |
| 2019/0253308 A1 | 8/2019 | Huang et al. | |
| 2020/0092908 A1* | 3/2020 | Li | H04W 72/0446 |
| 2021/0014881 A1* | 1/2021 | Aiba | H04L 1/1822 |
| 2021/0067268 A1* | 3/2021 | Seo | H04L 25/0238 |
| 2021/0144746 A1* | 5/2021 | Ji | H04W 72/23 |
| 2022/0304002 A1* | 9/2022 | Wang | H04L 5/0094 |

FOREIGN PATENT DOCUMENTS

| | | | | |
|---|---|---|---|---|
| CN | 109644082 A | | 4/2019 | |
| CN | 110166203 A | | 8/2019 | |
| WO | 2019143164 A1 | | 7/2019 | |
| WO | WO-2021024184 A1 | * | 2/2021 | ........... H04L 5/0007 |
| WO | 2021035589 A1 | | 3/2021 | |

OTHER PUBLICATIONS

MCC Support. 3GPP TSG RAN WG1 Meeting #98 R1-1907973; Final Report of 3GPP TSG RAN WG1 #97 v1.0.0 (Reno, USA, May 13-17, 2019), Prague, Czech Rep, Aug. 26-30, 2019, entire document.
The first Office Action and search report of corresponding Chinese application No. 202210400117.3, dated Jun. 2, 2023.
International Search Report (ISR) dated May 28, 2020 for Application No. PCT/CN2019/103130.
Samsung:'Enhancements on Multi-TRP/Panel Transmission' 3GPP TSG RAN WG1 Meeting #97 R1-1906968 May 17, 2019, entire document.
VIVO:'Further Discussion on Multi-TRP Transmission' 3GPP TSG RAN WG1 #96bis R1-1905610 Apr. 12, 2019, entire document.
Nokia, Nokia Shanghai Bell:'Remaining details on search space' 3GPP TSG RAN WG1 #93 R1-1806142 May 25, 2018, entire document.
Written Opinion of the International Searching Authority in International Application No. PCT/CN2019/103130, mailed on May 26, 2020, with English translation provided by Google Translate.
ZTE, "On PDCCH enhancements for NR URLLC", R1-1908235, 3GPP TSG RAN WG1 #98, Prague, CZ, Aug. 26-30, 2019, entire document.
Huawei, "Summary of Thursday offline discussion on PDCCH enhancements", R1-1907835, 3GPP TSG RAN WG1 Meeting #97, Reno, USA, May 13-17, 2019, entire document.
Extended European Search Report for European Application No. 19943667.6 issued on Jul. 25, 2022.

* cited by examiner

| Common signaling | | | | | | | | | |
|---|---|---|---|---|---|---|---|---|---|
| eMBB | | | | | | | | | |
| URLLC | URLLC | URLLC | URLLC | URLLC | URLLC | URLLC | | | |

A terminal receives at least one set of control signaling configuration, where the at least one set of control signaling configuration has an association relationship with at least one PDCCH detection capability of the terminal.

FIG. 4

Information transmission apparatus

Reporting unit 502

Receiving unit 501

Processing unit 503

FIG. 9

INFORMATION TRANSMISSION METHOD AND APPARATUS, TERMINAL, AND NETWORK DEVICE

CROSS-REFERENCE TO RELATED APPLICATIONS

This application is a continuation of International Application No. PCT/CN2019/103130, filed on Aug. 28, 2019, the disclosure of which is hereby incorporated by reference in its entirety.

TECHNICAL FIELD

Embodiments of the present application relates to the technical field of mobile communication, in particular to an information transmission method and apparatus, a terminal, and a network device.

BACKGROUND

A physical downlink control channel (PDCCH) detection capability is used to represent a terminal's ability to detect a PDCCH. At present, there is a problem that the PDCCH detection capability of a terminal does not match actual transmission demand distribution of a PDCCH, thereby failing to meet requirements of low service latency or increasing power consumption of the terminal.

SUMMARY

Embodiments of the present application provide an information transmission method and apparatus, a terminal, and a network device.

The information transmission method provided in the embodiments of the present application includes:
  receiving, by a terminal, at least one set of control signaling configuration, where the at least one set of control signaling configuration has an association relationship with at least one PDCCH detection capability of the terminal.

The information transmission method provided in the embodiments of the present application includes:
  sending, by a network device, at least one set of control signaling configuration, where the at least one set of control signaling configuration has an association relationship with at least one PDCCH detection capability of the terminal.

The information transmission apparatus provided in the embodiments of the present application includes:
  a receiving unit, configured to receive at least one set of control signaling configuration, where the at least one set of control signaling configuration has an association relationship with at least one PDCCH detection capability of the terminal.

The information transmission apparatus provided in the embodiments of the present application includes:
  a sending unit, configured to send at least one set of control signaling configuration, where the at least one set of control signaling configuration has an association relationship with at least one PDCCH detection capability of the terminal.

A terminal provided in the embodiments of the present application includes a processor and a memory. The memory is configured to store a computer program, and the processor is configured to call and run the computer program stored in the memory to execute the information transmission method.

A network device provided in the embodiments of the present application includes a processor and a memory. The memory is configured to store a computer program, and the processor is configured to call and run the computer program stored in the memory to execute the information transmission method.

A chip provided in the embodiments of the present application is used to implement the information transmission method.

Specifically, the chip includes: a processor configured to call and run a computer program from a memory, so that a device on which the chip is installed executes the information transmission method.

A computer readable storage medium provided in the embodiments of the present application is configured to store a computer program, and the computer program enables a computer to execute the information transmission method.

A computer program product provided in the embodiments of the present application includes a computer program instruction, and the computer program instruction enables a computer to execute the information transmission method.

A computer program provided in the embodiments of the present application, when running on a computer, enables the computer to execute the information transmission method.

Through the above technical solutions, control signaling configuration is associated with a PDCCH detection capability, so that a terminal may quickly demodulate a control signaling with a low delay requirement, and may also process a control signaling insensitive to delay at a normal speed or a slow speed, thereby achieving a purpose of energy saving and reducing complexity of the terminal.

BRIEF DESCRIPTION OF DRAWINGS

The drawings described here are used to provide a further understanding of the present application and constitute a part of the present application. Illustrative embodiments and descriptions of the present application are used to explain the present application and do not constitute an improper restriction on the present application. In the drawings.

DESCRIPTION OF EMBODIMENTS

Technical solutions of embodiments of the present application will be described in conjunction with drawings in the embodiments of the present application. Obviously, described embodiments are part of the embodiments of the present application, not all of the embodiments. Based on the embodiments of the present application, all other embodiments obtained by persons of ordinary skills in the art without creative labor belong to protection scope of the present application.

The technical solutions of the embodiments in the present application may be applied to various communication systems, for example: a long term evolution (LTE) system, an LTE frequency division duplex (FDD) system, an LTE time division duplex (TDD) system, a 5G communication system, or a future communication system, etc.

Figure 1:
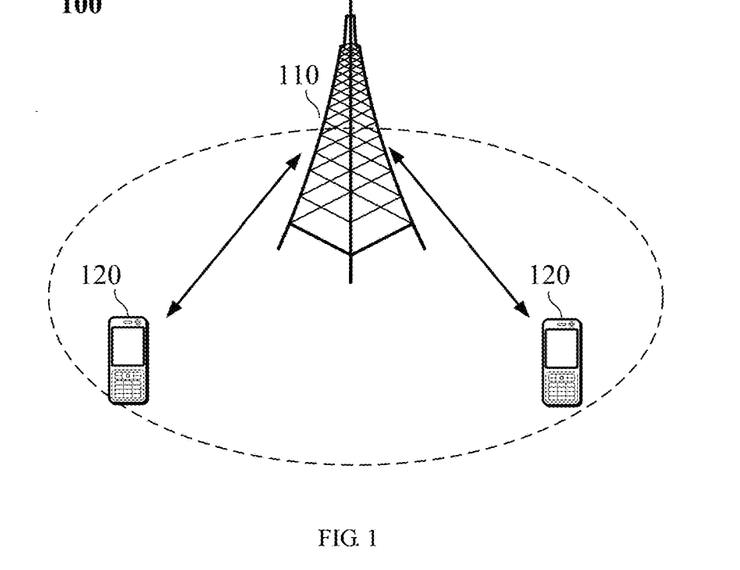
FIG. 1 is a schematic diagram of a communication system architecture provided in an embodiment of the present application.

For example, a communication system 100 applied in an embodiment of the present application is shown in FIG. 1. The communication system 100 may include a network device 110, and the network device 110 may be a device that communicates with a terminal 120 (or a communication terminal or a terminal). The network device 110 may provide communication coverage for a specific geographic area, and may communicate with terminals located in the coverage area. In an implementation manner, the network device 110 may be an evolutional NodeB (eNB or NodeB) in an LTE system, or a wireless controller in a cloud radio access network (CRAN), or the network device may be a mobile switching center, a relay station, an access point, an on-board device, a wearable device, a hub, a switch, a bridge, a router, a network device in a 5G network or a network device in a future communication system, etc.

The communication system 100 further includes at least one terminal 120 located within the coverage area of the network device 110. As used herein, "terminal device" includes but is not limited to a connection via a wired lines, such as a connection via a public switched telephone network (PSTN), a digital subscriber line (DSL), a digital cable, and a direct cable; and/or a connection via another data network; and/or a connection via a wireless interface, such as a cellular network, a wireless local area network (WLAN), a digital television network such as a Digital Video Broadcasting-Handheld (DVB-H) network, a satellite network, an Amplitude Modulation-Frequency Modulation (AM-FM) broadcast transmitter; and/or a connection via an apparatus of another terminal device configured to receive/send a communication signal; and/or a connection via an Internet of Things (IoT) device. A terminal device configured to communicate through a wireless interface may be called a "wireless communication terminal", a "wireless terminal" or a "mobile terminal". Examples of the mobile terminal include, but are not limited to, a satellite or a cellular phone; a personal communications system (PCS) terminal which may combine cellular radio telephone with abilities of data processing, fax, and data communication; a Personal Digital Assistant (PDA) that may include a radiotelephone, a pager, Internet/intranet access, a web browsers, a notebook, a calendar, and/or a global positioning system (GPS) receiver; and a conventional laptop and/or a palmtop receiver or other electronic apparatuses including a radio telephone transceiver. The terminal device may refer to an access terminal, user equipment (UE), a subscriber unit, a subscriber station, a mobile station, a mobile platform, a remote station, a remote terminal, a mobile device, a user terminal, a terminal, a wireless communication device, a user agent or a user apparatus. An access terminal may be a cellular phone, a cordless phone, a session initiation protocol (SIP) phone, a wireless local loop (WLL) station, a personal digital assistant (PDA), a handheld device with wireless communication function, a computing device or other processing devices connected to wireless modem, an on-board device, a wearable device, a terminal in 5G network or a terminal in a future evolved PLMN, etc.

In an implementation manner, a device to device (D2D) communication may be performed between the terminal devices 120.

In an implementation manner, the 5G system or the 5G network may also be called a new radio (NR) system or an NR network.

FIG. 1 shows one network device and two terminal devices by way of example. In an implementation manner, the communication system 100 may include a plurality of network devices and other number of terminal devices may be included in a coverage area of each network device, which is not limited by the embodiments of the present application.

In an implementation manner, the communication system 100 may further include other network entities such as a network controller, a mobile management entity, etc., which is not limited by the embodiment of the present application.

It should be understood that a device with a communication function in a network/system in the embodiments of the present application may be called a communication device. Taking the communication system 100 shown in FIG. 1 as an example, the communication device may include the network device 110 and the terminal 120 with a communication function, and the network device 110 and the terminal 120 may be the specific devices described above, which are not described in detail here. The communication device may also include other devices in the communication system 100, for example, a network controller, a mobility management entity and other network entities, which are not limited in the embodiment of the present application.

It should be understood that terms "system" and "network" are often used interchangeably herein. The term "and/or" is only an association relationship describing associated objects herein, which means that there may be three kinds of relationships, for example, A and/or B, which may mean that A exists alone; A and B exist at the same time; and B exists alone. In addition, characters "/" herein generally indicates that context objects are in a relationship of "or".

In order to facilitate understanding the technical solutions of the embodiments of the present application, related technical solutions of the embodiments of the present application are described below.

➢ Blind Detection

A terminal adopts blind detection for receiving downlink control information (DCI), that is, the terminal detects a limited number of candidate DCI in a time-frequency domain span configured by a network, and checks whether the DCI is received correctly through cyclic redundancy check (CRC) in the candidate DCI. Where the network jointly configures the span of PDCCH blind detection and the candidate DCI through a search space (SS) and a control resource set (CORESET).

Configuration of the search space is used to determine a PDCCH detection period, candidate DCI, and an associated CORESET, and configuration of the CORESET is used to determine a time-frequency domain range of the PDCCH detection and a transmission mode of a PDCCH in the time-frequency domain range (e.g., whether it is interleaved).

The search space is categorized as a common search space (CSS) and a UE specific search space (USS). Where the CSS is mainly used for sending of common control information, and the USS is mainly used for sending of user-level scheduling information.

➤ Dropping Rule

A PDCCH detection capability is used to represent a terminal's ability to detect a PDCCH. In an implementation manner, the PDCCH detection capability includes a first capability and/or a second capability, where the first capability refers to a maximum number of monitored PDCCH candidates supported by the terminal in a first time window, and the second capability refers to a maximum number of non-overlapped control channel elements (CCE) supported by the terminal for channel estimation in the first time window. As long as one index exceeds the limit, it is considered that the terminal's ability to detect a PDCCH is exceeded. For a candidate PDCCH beyond the capability, or all PDCCHs in a search space where the candidate PDCCH is located, the detection is abandoned.

➤ PDCCH Detection Capability.

1) Rel-15 defines a PDCCH detection capability for a slot, that is, a maximum number of monitored PDCCH candidates in a slot and a maximum number of non-overlapped CCEs for channel estimation. When in a slot, a number of blind PDCCH detections or a number of non-overlapped CCEs for channel estimation of a terminal exceeds the maximum number, the terminal stops detecting a PDCCH.

Figure 2:
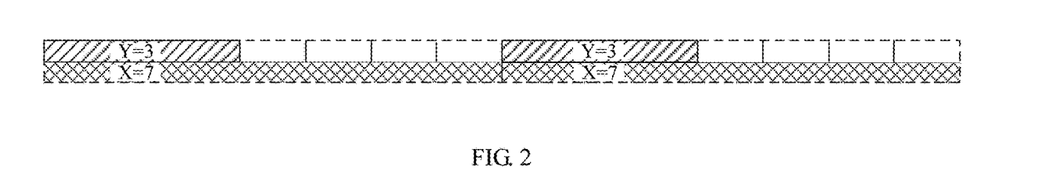
FIG. 2 is a schematic diagram of a PDCCH detection span provided in an embodiment of the present application.

2) Rel-16 introduces a PDCCH detection capability for a PDCCH monitoring span, for example, Table 1 shows multiple PDCCH detection capabilities. Table 1 takes a number of non-overlapped CCEs for channel estimation as an example, and each PDCCH detection capability corresponds to a maximum number of non-overlapped CCEs for channel estimation in a PDCCH detection span. Where different PDCCH detection spans are represented through a combination $\{X, Y, u\}$, where X represents an interval between two spans; Y represents a time domain range where a PDCCH is located in a span; u represents a subcarrier spacing; and C represents the maximum number of the non-overlapped CCEs. As for Combination 3, a PDCCH detection span is shown in FIG. 2.

TABLE 1

|  | X | Y | C<br>u = 1 |
|---|---|---|---|
| Combination 1 | 2 | 2 | 16 |
| Combination 2 | 4 | 3 | 32 |
| Combination 3 | 7 | 3 | 64 |
| Combination 4<br>(Rel-15) | 14 | 3 | 56 |

If the PDCCH detection capability defined by Rel-15 is adopted, the PDCCH detection capability is insufficient, which cannot meet requirements of low delay (for example, at least one PDCCH transmission opportunity every 2 symbols).

Figure 3:
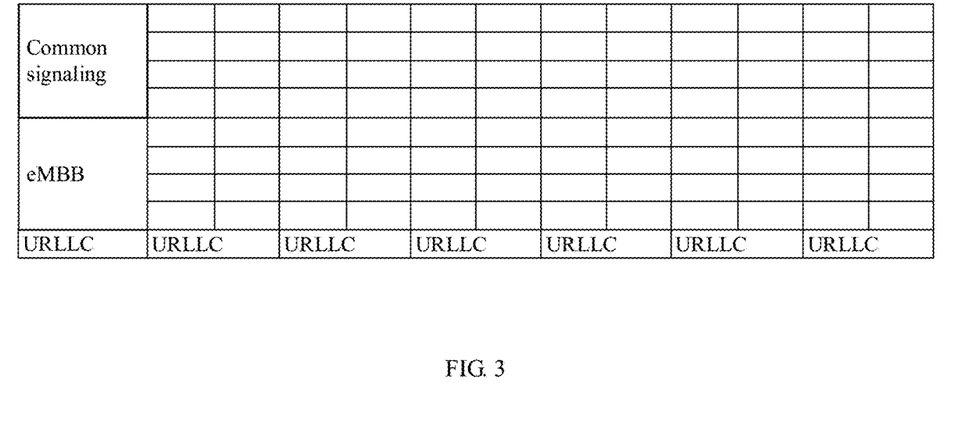
FIG. 3 is a schematic diagram of PDCCH distribution provided in an embodiment of the present application.

If the PDCCH detection capability defined by Rel-16 is adopted, detection opportunities will be evenly distributed to each PDCCH detection span. However, in fact, PDCCH distribution is uneven, as shown in FIG. 3. For example, most of scheduling information of enhanced mobile broadband (eMBB) and transmission of common signaling are concentrated at a beginning of a slot, and only scheduling information of ultra-reliable and low latency communications (URLLC) is distributed in a middle of the slot, so the PDCCH detection capability does not match actual transmission demand distribution of a PDCCH. Therefore, following technical solutions of the embodiments of the present application are proposed.

Figure 4:
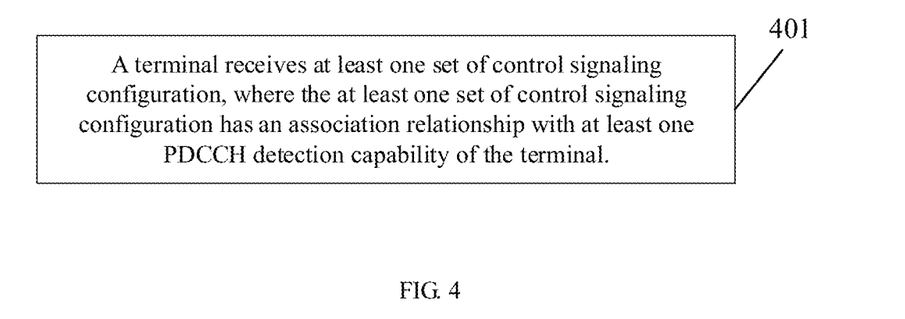
FIG. 4 is a schematic flowchart of an information transmission method provided in an embodiment of the present application.

FIG. 4 is a schematic flowchart of an information transmission method provided in an embodiment of the present application, as shown in FIG. 4, the information transmission method includes following steps:

step 401: a terminal receives at least one set of control signaling configuration, where the at least one set of control signaling configuration has an association relationship with at least one PDCCH detection capability of the terminal.

Specifically, the network device sends at least one set of control signaling configuration, and correspondingly, the terminal receives the at least one set of control signaling configuration sent by the network device. In an implementation manner, the network device is a base station, for example, a gNB.

In the present embodiment, before the terminal receives the at least one set of control signaling configuration, the terminal reports the at least one PDCCH detection capability. The network device receives the at least one PDCCH detection capability reported by the terminal, and sends the at least one set of control signaling configuration to the terminal based on the at least one PDCCH detection capability reported by the terminal, where the at least one set of control signaling configuration has the association relationship with the at least one PDCCH detection capability of the terminal.

In an implementation manner, the PDCCH detection capability includes at least one of the following:

a first capability, the first capability referring to a maximum number of monitored PDCCH candidates supported by the terminal in a first time window;

a second capability, the second capability referring to a maximum number of non-overlapped CCEs for channel estimation supported by the terminal in the first time window.

In an implementation manner, the first time window is configured by a network or agreed through a protocol.

In an implementation manner, the control signaling configuration is used to determine at least one of the following: a search space, a CORESET, and a candidate PDCCH.

For example, the control signaling configuration includes at least one of the following: search space configuration, CORESET configuration, and candidate PDCCH configuration.

In an implementation manner, the at least one set of control signaling configuration is configured in a semi-persistent manner.

For example, the at least one set of control signaling configuration is configured through radio resource control (RRC) signaling.

In an implementation manner, the association relationship between the at least one set of control signaling configuration and the at least one PDCCH detection capability is configured in a semi-persistent manner.

For example, the association relationship between the at least one set of control signaling configuration and the at least one PDCCH detection capability is configured through RRC signaling.

In the embodiment of the present application, for an overlapping span of multiple PDCCH detection capabilities, there are following two types of relationships among the multiple PDCCH detection capabilities.

> The multiple PDCCH detection capabilities are in an independent relationship.

In a case that the multiple PDCCH detection capabilities are in the independent relationship, the terminal independently executes a dropping rule according to the multiple PDCCH detection capabilities.

Here, the dropping rule refers to dropping at least one of the following which is beyond the PDCCH detection capabilities: a search space, a CORESET, and a candidate PDCCH.

> The multiple PDCCH detection capabilities are in an inclusive relationship or in an included relationship.

In a case that the multiple PDCCH detection capabilities are in the inclusive relationship or in the included relationship, the terminal jointly executes a dropping rule according to the multiple PDCCH detection capabilities.

Here, the dropping rule refers to dropping at least one of the following which is beyond the PDCCH detection capabilities: a search space, a CORESET, and a candidate PDCCH.

According to the technical solutions of the present embodiment, the terminal reports multiple PDCCH detection capabilities, and each PDCCH detection capability is associated with control signaling configuration, thus achieving an effect of PDCCH classification processing, which may not only meet demodulation requirements of low delay signaling, but also satisfy slow demodulation of delay-insensitive signaling (avoiding the increasing of complexity of the terminal due to high speed processing).

Following specific examples are used to illustrate the technical solutions of the embodiments of the present application. It should be noted that in the following examples, the PDCCH detection capability being the second capability is taken as an example (that is, a capability of a maximum number of non-overlapped CCEs supported by the terminal), which, however, is not limited to this, and any PDCCH detection capability may be applied to the following examples.

Example 1: The Search Space Configuration has an Association Relationship with the PDCCH Detection Capability The terminal reports the at least one PDCCH detection capability. The terminal receives the at least one set of control signaling configuration, where the at least one set of control signaling configuration has an association relationship with the at least one PDCCH detection capability, and the control signaling configuration is search space configuration.

For example, the terminal reports two PDCCH detection capabilities, one for PDCCH detection spans, e.g., {X=2, Y=2, u=1, C=16}, and the other for slots, e.g., {X=14, Y=3, u=1, C=56}. The terminal receives 10 pieces of search space configuration, and the 10 pieces of search space configuration are used to determine 10 search spaces, where 4 search spaces are CSS, and 6 search spaces are USS. Where 4 CSSs and 4 USSs are associated with the PDCCH detection capability {X=14, Y=3, u=1, C=56}, and 2 USSs are associated with the PDCCH detection capability {X=2, Y=2, u=1, C=16}. This association relationship means that slow detection may be adopted for the 4 CSSs and the 4 USSs, for example, the detection may be completed within one slot.

Quick detection may be adopted for the 2 USSs, for example, it cannot exceed reception time of a next PDCCH detection span.

According to the at least one PDCCH detection capability, the terminal drops a search space which corresponds to the at least one PDCCH detection capability and is beyond the PDCCH detection capability. Where the dropping rule may be implemented in any of following manners:

1) for an overlapping span of multiple PDCCH detection capabilities, the multiple PDCCH detection capabilities are set independently (i.e., the multiple PDCCH detection capabilities are in an independent relationship).

For example, for the 2 USSs corresponding to the PDCCH detection capability {X=2, Y=2, u=1, C=16}, when a number of non-overlapped CCEs corresponding to the 2 USSs exceeds 16, an out-of-limit low-priority USS (usually, a USS label may be used as a priority flag) or an out-of-limit low-priority candidate PDCCH (usually, a priority flag may be based on a USS label and a PDCCH label) is dropped. For the 4 CSSs and the 4 USSs corresponding to the PDCCH detection capability {X=14, Y=3, u=1, C=56}, when a number of non-overlapped CCEs corresponding to the 4 CSSs and the 4 USSs exceeds 56, an out-of-limit low-priority USS (usually, a USS label may be used as a priority flag) or an out-of-limit low-priority candidate PDCCH (usually, a priority flag may be based on a USS label and a PDCCH label) is dropped.

2) For an overlapping span of multiple PDCCH detection capabilities, the multiple PDCCH detection capabilities are set in an inclusive manner or in an included manner (i.e., the multiple PDCCH detection capabilities are in an inclusive relationship or in an included relationship).

For example, for the 2 USSs corresponding to the PDCCH detection capability {X=2, Y=2, u=1, C=16}, when the number of non-overlapped CCEs corresponding to the 2 USSs exceeds 16, an out-of-limit low-priority USS (usually, a USS label may be used as a priority flag) or an out-of-limit low-priority candidate PDCCH (usually, a priority flag may be based on a USS label and a PDCCH label) is dropped. For the 4 CSSs and the 4 USSs corresponding to the PDCCH detection capability {X=14, Y=3, u=1, C=56}, when the number of non-overlapped CCEs corresponding to the 4 CSSs and the 4 USSs exceeds 40 (56−16=40), an out-of-limit low-priority USS (usually, a USS label may be used as a priority flag) or an out-of-limit low-priority candidate PDCCH (usually, a priority flag may be based on a USS label and a PDCCH label) is dropped.

In the above example, the overlapping span is determined by a span limited by {X, Y}, for example, {2, 2} and {7, 3}, and the overlapping span is the first three symbols. Or, the overlapping span may be determined by a span limited by {X}, for example, {2, 2} and {7, 3}, and the overlapping span is 7 symbols.

Example 2: The CORESET Configuration has an Association Relationship with the PDCCH Detection Capability The terminal reports the at least one PDCCH detection capability. The terminal receives the at least one set of control signaling configuration, where the at least one set of control signaling configuration has an association relationship with the at least one PDCCH detection capability, and the control signaling configuration is CORESET configuration.

For example, the terminal reports two PDCCH detection capabilities, one for PDCCH detection spans, e.g., {X=2, Y=2, u=1, C=16}, and the other for slots, e.g., {X=14, Y=3, u=1, C=56}. The terminal receives 4 pieces of CORESET configuration, and the 4 pieces of CORESET configuration are used to determine 4 CORESETs, where 3 CORESETs are associated with the PDCCH detection capability {X=14, Y=3, u=1, C=56}, and 1 CORESET is associated with the PDCCH detection capability {X=2, Y=2, u=1, C=16}. This association relationship means that slow detection may be adopted for a PDCCH within the 3 CORESETs, for example, the detection may be completed within one slot. Quick detection may be adopted for a PDCCH within the 1 CORESET, for example, it cannot exceed reception time of a next PDCCH detection span.

According to the at least one PDCCH detection capability, the terminal drops a CORESET which corresponds to the at least one PDCCH detection capability and is beyond the PDCCH detection capability. Where the dropping rule may adopt any of following manners:

1) for an overlapping span of multiple PDCCH detection capabilities, the multiple PDCCH detection capabilities are set independently (i.e., the multiple PDCCH detection capabilities are in an independent relationship).

For example, for the 1 CORESET corresponding to the PDCCH detection capability {X=2, Y=2, u=1, C=16}, when a number of non-overlapped CCEs corresponding to the 1 CORESET exceeds 16, an out-of-limit low-priority CORESET (usually, a CORESET label may be used as a priority flag) or an out-of-limit low-priority candidate PDCCH (usually, a priority flag may be based on a CORESET label and a PDCCH label) is dropped. For the 3 CORESETs corresponding to the PDCCH detection capability {X=14, Y=3, u=1, C=56}, when a number of non-overlapped CCEs corresponding to the 3 CORESETs exceeds 56, an out-of-limit low-priority CORESET (usually, a CORESET label may be used as a priority flag) or an out-of-limit low-priority candidate PDCCH (usually, a priority flag may be based on a CORESET label and a PDCCH label) is dropped.

2) For an overlapping span of multiple PDCCH detection capabilities, the multiple PDCCH detection capabilities are set in an inclusive manner or in an included manner (i.e., the multiple PDCCH detection capabilities are in an inclusive relationship or in an included relationship).

For example, for the 1 CORESET corresponding to the PDCCH detection capability {X=2, Y=2, u=1, C=16}, when the number of non-overlapped CCEs corresponding to the 1 CORESET exceeds 16, an out-of-limit low-priority CORESET (usually, a CORESET label may be used as a priority flag) or an out-of-limit low-priority candidate PDCCH (usually, a priority flag may be based on a CORESET label and a PDCCH label) is dropped. For the 3 CORESETs corresponding to the PDCCH detection capability {X=14, Y=3, u=1, C=56}, when the number of non-overlapped CCEs corresponding to the 3 CORESETs exceeds 40 (56−16=40), an out-of-limit low-priority CORESET (usually, a CORESET label may be used as a priority flag) or an out-of-limit low-priority candidate PDCCH (usually, a priority flag may be based on a CORESET label and a PDCCH label) is dropped.

Typically, the dropping rules are executed in turn according to priorities of the multiple PDCCH detection capabilities. Typically, the priority is higher when a value of X is smaller, which may ensure priority processing of a low-latency service.

Typically, according to some dropping rules for PDCCH detection capabilities, other PDCCH detection capabilities meet the requirements by default and do not need to be dropped.

Figure 5:
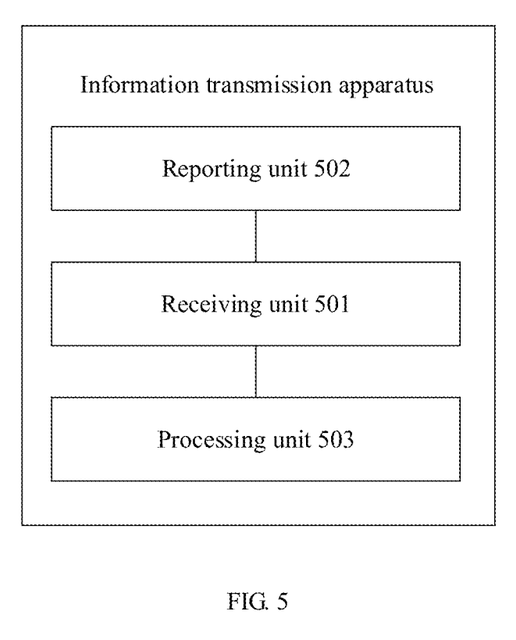
FIG. 5 is a first schematic diagram of a structure of an information transmission apparatus provided in an embodiment of the present application.

FIG. 5 is a first schematic diagram of a structure of an information transmission apparatus provided in an embodiment of the present application. In an implementation manner, the information transmission apparatus is applied to a terminal. As shown in FIG. 5, the information transmission apparatus includes:

a receiving unit 501, configured to receive at least one set of control signaling configuration, where the at least one set of control signaling configuration has an association relationship with at least one PDCCH detection capability of the terminal.

In an implementation manner, the apparatus further includes:

a reporting unit 502, configured to report the at least one PDCCH detection capability.

In an implementation manner, the PDCCH detection capability includes at least one of the following:

a first capability, the first capability referring to a maximum number of monitored PDCCH candidates supported by the terminal in a first time window;

a second capability, the second capability referring to a maximum number of non-overlapped CCEs for channel estimation supported by the terminal in the first time window.

In an implementation manner, the first time window is configured by a network or agreed through a protocol.

In an implementation manner, the control signaling configuration is used to determine at least one of the following: a search space, a CORESET, and a candidate PDCCH.

In an implementation manner, the at least one set of control signaling configuration is configured in a semi-persistent manner.

In an implementation manner, the association relationship between the at least one set of control signaling configuration and the at least one PDCCH detection capability is configured in a semi-persistent manner.

In an implementation manner, for an overlapping span of multiple PDCCH detection capabilities, the multiple PDCCH detection capabilities are in an independent relationship.

In an implementation manner, the apparatus further includes: a processing unit 503, configured to independently execute a dropping rule according to the multiple PDCCH detection capabilities when the multiple PDCCH detection capabilities are in the independent.

In an implementation manner, for an overlapping span of multiple PDCCH detection capabilities, the multiple PDCCH detection capabilities are in an inclusive relationship or in an included relationship.

In an implementation manner, the apparatus further includes: a processing unit 503, configured to jointly execute a dropping rule according to the multiple PDCCH detection capabilities when the multiple PDCCH detection capabilities are in the inclusive relationship or in the included relationship.

In an implementation manner, the dropping rule refers to dropping at least one of the following which is beyond the PDCCH detection capabilities: a search space, a CORESET, and a candidate PDCCH.

Persons of skills in the art should understand that related descriptions of the information transmission apparatus according to the embodiments of the present application may be understood with reference to related descriptions of the information transmission method according to the embodiments of the present application.

Figure 6:
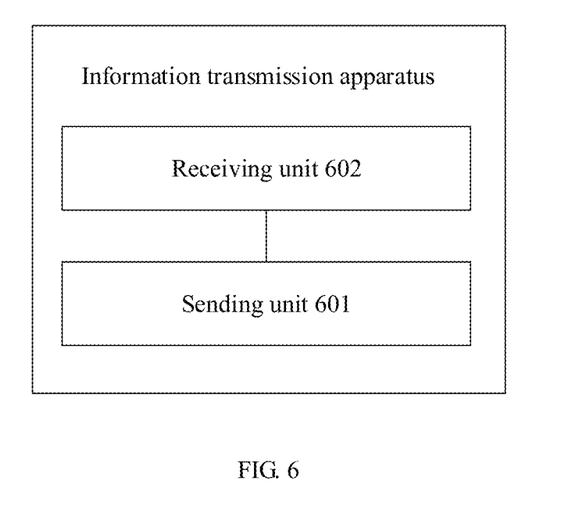
FIG. 6 is a second schematic diagram of a structure of an information transmission apparatus provided in an embodiment of the present application.

FIG. 6 is a second schematic diagram of a structure of an information transmission apparatus provided in an embodiment of the present application. In an implementation manner, the information transmission apparatus is applied to a network device. As shown in FIG. 6, the information transmission apparatus includes:

a sending unit 601, configured to send at least one set of control signaling configuration, where the at least one set of control signaling configuration has an association relationship with at least one PDCCH detection capability of the terminal.

In an implementation manner, the apparatus further includes:

a receiving unit 602, configured to receive the at least one PDCCH detection capability reported by the terminal.

In an implementation manner, the PDCCH detection capability includes at least one of the following:

a first capability, the first capability referring to a maximum number of monitored PDCCH candidates supported by the terminal in a first time window;

a second capability, the second capability referring to a maximum number of non-overlapped CCEs for channel estimation supported by the terminal in the first time window.

In an implementation manner, the first time window is configured by a network or agreed through a protocol.

In an implementation manner, the control signaling configuration is used to determine at least one of the following: a search space, a CORESET, and a candidate PDCCH.

In an implementation manner, the at least one set of control signaling configuration is configured in a semi-persistent manner.

In an implementation manner, the association relationship between the at least one set of control signaling configuration and the at least one PDCCH detection capability is configured in a semi-persistent manner.

In an implementation manner, for an overlapping span of multiple PDCCH detection capabilities, the multiple PDCCH detection capabilities are in an independent relationship.

In an implementation manner, for an overlapping span of multiple PDCCH detection capabilities, the multiple PDCCH detection capabilities are in an inclusive relationship or in an included relationship.

Persons of skills in the art should understand that related descriptions of the information transmission apparatus according to the embodiments of the present application may be understood with reference to related descriptions of the information transmission method according to the embodiments of the present application.

Figure 7:
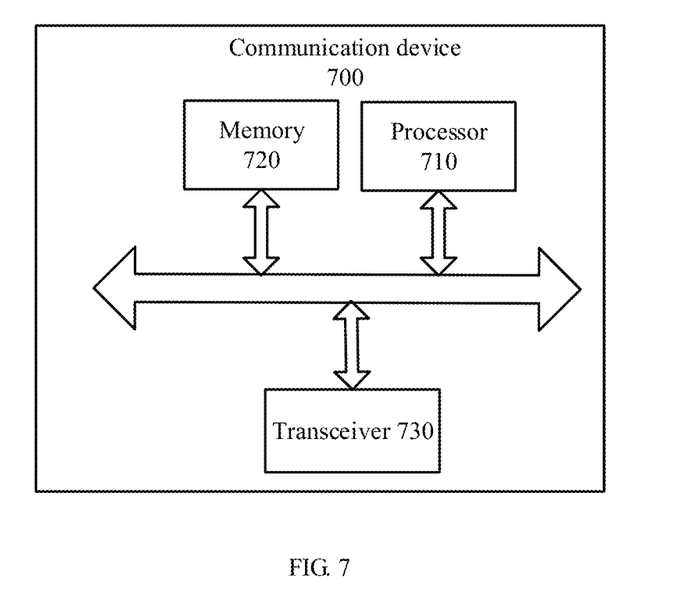
FIG. 7 is a schematic structural diagram of a communication device provided in an embodiment of the present application.

FIG. 7 is a schematic structural diagram of a communication device 700 provided in an embodiment of the present application. The communication device may be either a terminal or a network device. The communication device 700 shown in FIG. 7 includes a processor 710, and the processor 710 may call a computer program from a memory and run the computer program to implement the methods in the embodiments of the present application.

In an implementation manner, as shown in FIG. 7, the communication device 700 may further include a memory 720. Where the processor 710 may call a computer program from the memory 720 and run the computer program to implement the methods in the embodiments of the present application.

Where the memory 720 may be a separate device independent from the processor 710, or may be integrated in the processor 710.

In an implementation manner, as shown in FIG. 7, the communication device 700 may further include a transceiver 730, and the processor 710 may control the transceiver 730 to communicate with other device, specifically, may send information or data to other device, or receive information or data sent by other device.

Where the transceiver 730 may include a transmitter and a receiver. The transceiver 730 may further include an antenna, and the number of antennas may be one or more.

In an implementation manner, the communication device 700 may specifically be the network device of the embodiments of the present application, and the communication device 700 may implement a corresponding process implemented by the network device in each method of the embodiments of the present application. For the sake of brevity, details are not described herein.

In an implementation manner, the communication device 700 may specifically be the terminal device/the terminal of the embodiments of the present application, and the communication device 700 may implement a corresponding process implemented by the terminal device/the terminal in each method of the embodiments of the present application. For the sake of brevity, details are not described herein.

Figure 8:
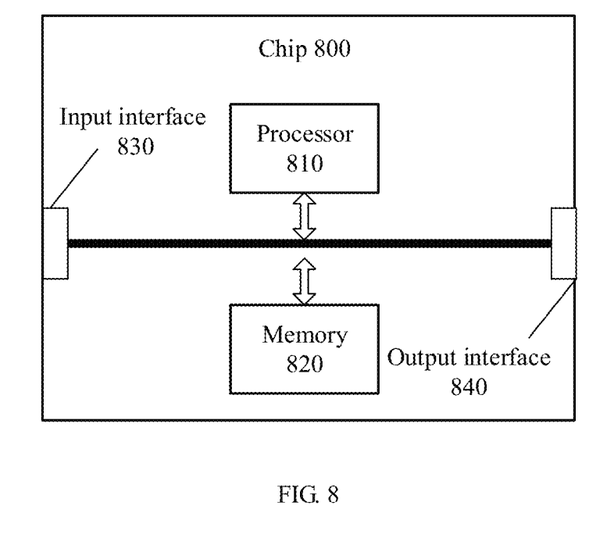
FIG. 8 is a schematic structural diagram of a chip in an embodiment of the present application.

FIG. 8 is a schematic structural diagram of a chip in an embodiment of the present application. A chip 800 shown in FIG. 8 includes a processor 810, and the processor 810 may call a computer program from a memory and run the computer program to implement the methods in the embodiments of the present application.

In an implementation manner, as shown in FIG. 8, the chip 800 may further include a memory 820. Where the processor 810 may call a computer program from the memory 820 and run the computer program to implement the methods in the embodiments of the present application.

Where the memory 820 may be a separate device independent from the processor 810, or may be integrated in the processor 810.

In an implementation manner, the chip 800 may further include an input interface 830. Where the processor 810 may control the input interface 830 to communicate with other devices or chips, and specifically, may obtain information or data sent by other devices or chips.

In an implementation manner, the chip 800 may further include an output interface 840. Where the processor 810 may control the output interface 840 to communicate with other devices or chips, and specifically, may output information or data to other devices or chips.

In an implementation manner, the chip may be applied to the network device in the embodiments of the present application, and the chip may implement a corresponding process implemented by the network device in each method of the embodiments of the present application. For the sake of brevity, details are not described herein.

In an implementation manner, the chip may be applied to the mobile terminal/terminal in the embodiments of the present application, and the chip may implement a corresponding process implemented by the network device in each method of the embodiments of the present application. For the sake of brevity, details are not described herein.

It should be understood that, the chip mentioned in the embodiment of the present application may also be referred to as a system-level chip, a system chip, a chip system, or a system-on-chip, etc.

Figure 9:
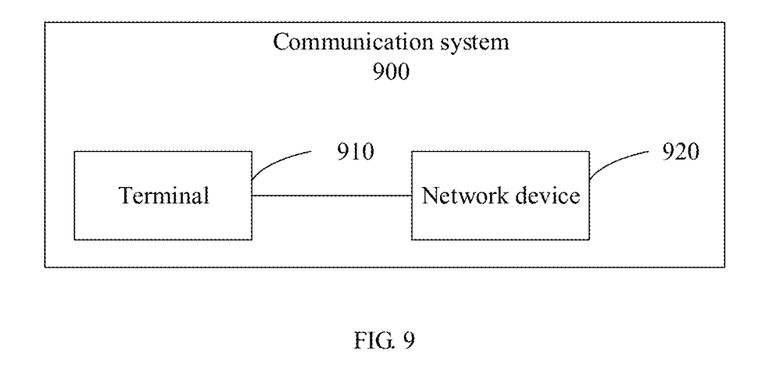
FIG. 9 is a schematic block diagram of a communication system provided in an embodiment of the present application.

FIG. 9 is a schematic block diagram of a communication system 900 provided in an embodiment of the present application. As shown in FIG. 9, the communication system 900 includes a terminal 910 and a network device 920.

Where the terminal device 910 may be used to implement corresponding functions implemented by the terminal device in the above methods, and the network device 920 may be used to implement corresponding functions implemented by the network device in the above methods. For the sake of brevity, the details are not described herein.

It should be understood that the processor of the embodiments of the present application may be an integrated circuit chip with signal processing capability. In the implementation process, the steps of the above-mentioned method embodiments may be completed by a hardware integrated logic circuit in the processor or an instruction in a form of software. The above-mentioned processor may be a general-purpose processor, a digital signal processor (DSP), an application specific integrated circuit (ASIC), a field programmable gate array (FPGA), or other programmable logic device, discrete gate or transistor logic device, discrete hardware component. The methods, steps, and logical block diagrams disclosed in the embodiments of the present application may be implemented or performed. The general-purpose processor may be a microprocessor or the processor may also be any conventional processor etc. The steps of the methods disclosed in the embodiments of the present application may be directly embodied as being performed and completed by a hardware decoding processor, or performed and completed by a combination of hardware and software modules in the decoding processor. The software modules may be located in a mature storage medium in the art such as a random-access memory, a flash memory, a read-only memory, a programmable read-only memory, or an electrically erasable programmable memory, a register, etc. The storage medium is located in a memory, and a processor reads the information in the memory and completes the steps of the above methods in combination with hardware thereof.

It can be understood that the memory in the embodiments of the present application may be a volatile memory or a non-volatile memory, or may include both the volatile and the non-volatile memory. Where the non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. Through an exemplary but not restrictive description, many forms of RAMs are available, for example, a static RAM (SRAM), a dynamic RAM (DRAM), a synchronous DRAM (SDRAM), a double data rate SDRAM (SDRAM), an enhanced SDRAM (ES-DRAM), a synchlink DRAM (SLDRAM) and a direct rambus RAM (DR RAM). It should be noted that the memory of the system and the method described herein is intended to include, but is not limited to, these memories and any other suitable types of memories.

The embodiments of the present application further provide a computer readable storage medium, which is used to store a computer program.

In an implementation manner, the computer readable storage medium may be applied to the network device in the embodiments of the present application, and the computer program enables a computer to execute the corresponding process implemented by the network device in each method of the embodiments of the present application. For the sake of brevity, the details are not described herein.

In an implementation manner, the computer readable storage medium may be applied to the mobile terminal/terminal in the embodiments of the present application, and the computer program enables a computer to execute the corresponding process implemented by the mobile terminal/terminal in each method of the embodiments of the present application.

For the sake of brevity, the details are not described herein.

The embodiment of the present application further provides a computer program product, including a computer program instruction.

In an implementation manner, the computer program product may be applied to the network device in the embodiments of the present application, and the computer program instruction enables a computer to execute the corresponding process implemented by the network device in each method of the embodiments of the present application. For the sake of brevity, the details are not described herein.

In an implementation manner, the computer program product may be applied to the mobile terminal/terminal in the embodiments of the present application, and the computer program instruction enables a computer to execute the corresponding process implemented by the mobile terminal/terminal in each method of the embodiments of the present application. For the sake of brevity, the details are not described herein.

The embodiments of the present application further provide a computer program.

In an implementation manner, the computer program may be applied to the network device in the embodiments of the present application, and the computer program enables a computer to execute the corresponding process implemented by the network device in each method of the embodiments of the present application. For the sake of brevity, the details are not described herein.

In an implementation manner, the computer program may be applied to the mobile terminal/terminal in the embodiments of the present application, and the computer program enables a computer to execute the corresponding process implemented by the mobile terminal/terminal in each method of the embodiments of the present application. For the sake of brevity, the details are not described herein.

Persons of skills in the art may be aware that the units and algorithm steps of the examples described in combination with the embodiments disclosed herein may be implemented by electronic hardware or a combination of computer software and electronic hardware. Whether these functions are executed by hardware or software depends on a specific application and a design constraint condition of the technical solutions. Professionals may use different methods for each specific application to implement the described functions, such implementation, however, should not be considered as being beyond scope of the present application.

Persons of skills in the art may clearly understand that, for convenience and conciseness of descriptions, a specific working process of the above-described system, device, and unit may refer to a corresponding process in the precious method embodiments, which will not be described here.

In the several embodiments provided in the present application, it should be understood that the disclosed system, apparatus, and method may be implemented in other ways. For example, the apparatus embodiments described above are only illustrative. For example, the division of the units is only a division of logical functions, and there may be other divisions in actual implementation, for example, a plurality of units or components may be combined or integrated into another system, or some features may be omitted or not implemented. In addition, the displayed or discussed mutual coupling, direct coupling or communication connection may be indirect coupling or communication connection through some interfaces, apparatus, or units, and may be in electrical, mechanical or other forms.

The units described as separate components may or may not be physically separated, and the components displayed as units may or may not be physical units, that is, the components may be located in a place, or the components may be distributed to a plurality of network units. Some or all of the units may be selected according to actual demand to achieve objectives of the solutions of the present embodiments.

In addition, functional units in each embodiment of the present application may be integrated into one processing unit, or each unit may exist alone physically, or two or more units may be integrated into one unit.

If the functions are implemented in a form of a software functional unit and sold or used as an independent product, it may be stored in a computer readable storage medium. Based on such understanding, the technical solutions of the present application essentially or a part that contributes to the existing technology or a part of the technical solutions may be embodied in a form of a software product. The computer software product is stored in a storage medium and includes several instructions which are used to enable a computer device (which may be a personal computer, a server, or a network device, etc.) to perform all or a part of the steps of the methods described in the various embodiments of the present application. The above-mentioned storage medium includes: a U disk, a mobile hard disk, a read-only memory (ROM), a random access memory (RAM), a magnetic disk, an optical disk or other medium that may store program codes.

The above are only specific implementations of the present application, but the protection scope of the present application is not limited thereto. Within the technical scope disclosed in the present application, changes or substitutions that may be easily thought of by any person of skills who is familiar with the present technical field should be covered in the protection scope of the present application. Therefore, the protection scope of the present application should be subject to the protection scope of claims.

What is claimed is:

1. An information transmission method, comprising:
receiving, by a terminal, multiple sets of control signaling configuration, wherein the multiple sets of control signaling configuration have a one to one correspondence to multiple physical downlink control channel (PDCCH) detection capabilities of the terminal, the control signaling configuration is used to determine at least one of the following: a search space, a control resource set (CORESET), and a candidate PDCCH, and each of the multiple PDCCH detection capabilities comprises at least one of the following: a first capability, the first capability referring to a maximum number of monitored PDCCH candidates supported by the terminal in a first time window; a second capability, the second capability referring to a maximum number of non-overlapped control channel elements (CCE) for channel estimation supported by the terminal in the first time window; and
performing, by the terminal, PDCCH detection according to the multiple sets of control signaling configuration respectively:

wherein for an overlapping span of the multiple PDCCH detection capabilities, the multiple PDCCH detection capabilities are in an independent relationship, and the method further comprises:
independently executing, by the terminal, a dropping rule according to the multiple PDCCH detection capabilities, wherein the dropping rule refers to dropping at least one of the following which is beyond the PDCCH detection capabilities: a search space, a CORESET, and a candidate PDCCH.

2. The method according to claim 1, wherein the method further comprises:
reporting, by the terminal, the multiple PDCCH detection capabilities.

3. The method according to claim 1, wherein the first time window is configured by a network or agreed through a protocol.

4. The method according to claim 1, wherein the one to one correspondence between the multiple sets of control signaling configuration and the multiple PDCCH detection capabilities is configured in a semi-persistent manner.

5. An information transmission apparatus, comprising:
at least one processor;
a transceiver; and
a memory communicatively connected to the at least one processor; wherein,
the memory stores an instruction executable by the at least one processor, and the instruction is executed by the at least one processor to enable the at least one processor to control the transceiver to receive multiple sets of control signaling configuration, wherein the multiple sets of control signaling configuration have a one to one correspondence to multiple physical downlink control channel (PDCCH) detection capabilities of the apparatus, the control signaling configuration is used to determine at least one of the following: a search space, a control resource set (CORESET), and a candidate PDCCH, and each of the multiple PDCCH detection capabilities comprises at least one of the following: a first capability, the first capability referring to a maximum number of monitored PDCCH candidates supported by the apparatus in a first time window; a second capability, the second capability referring to a maximum number of non-overlapped control channel elements (CCE) for channel estimation supported by the apparatus in the first time window;

wherein for an overlapping span of the multiple PDCCH detection capabilities, the multiple PDCCH detection capabilities are in an independent relationship, and the at least one processor is further enabled to:
perform PDCCH detection according to the multiple sets of control signaling configuration respectively:
independently execute a dropping rule according to the multiple PDCCH detection capabilities, wherein the dropping rule refers to dropping at least one of the following which is beyond the PDCCH detection capabilities: a search space, a CORESET, and a candidate PDCCH.

6. The apparatus according to claim 5, wherein the at least one processor is further enabled to report the multiple PDCCH detection capabilities.

7. The apparatus according to claim 5, wherein the first time window is configured by a network or agreed through a protocol.

8. The apparatus according to claim 5, wherein the one to one correspondence between the multiple sets of control signaling configuration and the multiple PDCCH detection capabilities is configured in a semi-persistent manner.

9. An information transmission apparatus, comprising:
at least one processor;
a transceiver; and
a memory communicatively connected to the at least one processor; wherein,
the memory stores an instruction executable by the at least one processor, and the instruction is executed by the at least one processor to enable the at least one processor to control the transceiver to send multiple sets of control signaling configuration to a terminal, the multiple sets of control signaling configuration respectively used for performing PDCCH detection, wherein the multiple sets of control signaling configuration have a one to one correspondence to multiple physical downlink control channel (PDCCH) detection capabilities of the terminal, the control signaling configuration is used to determine at least one of the following: a search space, a control resource set (CORESET), and a candidate PDCCH, and each of the multiple PDCCH detection capabilities comprises at least one of the following: a first capability, the first capability referring to a maximum number of monitored PDCCH candidates supported by the terminal in a first time window; a second capability, the second capability referring to a maximum number of non-overlapped control channel elements (CCE) for channel estimation supported by the terminal in the first time window;
wherein for an overlapping span of the multiple PDCCH detection capabilities, the multiple PDCCH detection capabilities are in an independent relationship, the multiple PDCCH detection capabilities used for independent execution of a dropping rule, wherein the dropping rule referring to dropping at least one of the following which is beyond the PDCCH detection capabilities: a search space, a CORESET, and a candidate PDCCH.

10. The apparatus according to claim 9, wherein the at least one processor is further enabled to control the transceiver to receive the multiple PDCCH detection capabilities reported by the terminal.

11. The apparatus according to claim 9, wherein the one to one correspondence between the multiple sets of control signaling configuration and the multiple PDCCH detection capabilities is configured in a semi-persistent manner.

* * * * *